(12) United States Patent
Kyung et al.

(10) Patent No.: US 7,710,916 B2
(45) Date of Patent: May 4, 2010

(54) METHOD FOR SETUP AND CONTROLLING SERVICE CONNECTION

(75) Inventors: Chan Ho Kyung, Anyang-si (KR);
Byung Kwan Yi, San Diego, CA (US);
Sang Gook Kim, San Diego, CA (US)

(73) Assignee: LG Electronics Inc., Seoul (KR)

( * ) Notice: Subject to any disclaimer, the term of this patent is extended or adjusted under 35 U.S.C. 154(b) by 958 days.

(21) Appl. No.: 11/458,660

(22) Filed: Jul. 19, 2006

(65) Prior Publication Data
US 2007/0037573 A1 Feb. 15, 2007

(30) Foreign Application Priority Data
Jul. 19, 2005 (KR) .................. 10-2005-0065409

(51) Int. Cl.
*H04W 4/00* (2006.01)
(52) U.S. Cl. .................................... 370/328
(58) Field of Classification Search .............. 370/328, 370/329; 455/419, 445, 414.1, 422.1
See application file for complete search history.

(56) References Cited

U.S. PATENT DOCUMENTS

| | | | | |
|---|---|---|---|---|
| 6,134,434 A * | 10/2000 | Krishnamurthi et al. | .... | 455/419 |
| 6,349,224 B1 * | 2/2002 | Lim | .......... | 455/466 |
| 6,608,818 B1 * | 8/2003 | Abrol et al. | ................ | 370/252 |
| 6,654,602 B1 * | 11/2003 | Fye et al. | ................ | 455/414.1 |
| 6,845,236 B2 * | 1/2005 | Chang | .................. | 455/414.1 |
| 6,909,714 B2 * | 6/2005 | Abrol et al. | ................ | 370/389 |
| 6,978,157 B1 * | 12/2005 | Amiens | .................... | 455/558 |
| 7,003,040 B2 * | 2/2006 | Yi | ........................ | 375/240.24 |
| 7,107,082 B2 * | 9/2006 | Lee | ........................ | 455/575.1 |
| 7,187,939 B2 * | 3/2007 | Ko et al. | ...................... | 455/466 |
| 7,200,385 B1 * | 4/2007 | Wallenius et al. | ......... | 455/414.1 |
| 7,242,674 B2 * | 7/2007 | Jin | .............................. | 370/329 |
| 7,483,436 B2 * | 1/2009 | Semper | ................. | 370/395.52 |
| 2002/0037710 A1 * | 3/2002 | Park | ............................ | 455/414 |
| 2002/0037712 A1 * | 3/2002 | Shin | ............................ | 455/414 |
| 2002/0077096 A1 * | 6/2002 | Jin | ............................. | 455/422 |
| 2002/0097846 A1 | 7/2002 | Jung | | |
| 2003/0224794 A1 * | 12/2003 | Kim et al. | .................. | 455/445 |
| 2005/0164726 A1 * | 7/2005 | Yeo | .......................... | 455/518 |
| 2006/0234760 A1 * | 10/2006 | Cheng | ........................ | 455/551 |
| 2007/0140252 A1 * | 6/2007 | Akhtar et al. | ........... | 370/395.2 |
| 2007/0238460 A1 * | 10/2007 | Yamen | ...................... | 455/436 |

FOREIGN PATENT DOCUMENTS

EP 1363467 A2 11/2003

* cited by examiner

*Primary Examiner*—Lester Kincaid
*Assistant Examiner*—Nathan Mitchell
(74) *Attorney, Agent, or Firm*—Lee, Hong, Degerman, Kang & Waimey

(57) ABSTRACT

A method of establishing connection between a first mobile station (MS) and a second MS in a mobile communication system is disclosed. More specifically, the method includes transmitting to at least one base station (BS) a service message which includes information of at least one service type supported by the first MS and the second MS. Here the at least one service type relates to a multimedia service supported by each of the first MS and the second MS. Furthermore, the method includes transmitting a request message which includes information of at least one service type selected by the first MS, receiving a response message which includes information of the selected service type which is supported by both the first MS and a second MS, and transmitting a connection complete message between the first MS and the second MS for communication using the selected service type.

37 Claims, 4 Drawing Sheets

METHOD FOR SETUP AND CONTROLLING SERVICE CONNECTION

This application claims the benefit of Korean Application No. P10-2005-0065409, filed on Jul. 19, 2005, which is hereby incorporated by reference.

BACKGROUND OF THE INVENTION

1. Field of the Invention

The present invention relates to a call setup, and more particularly, to a method of setup and controlling service connection.

2. Discussion of the Related Art

A mobile communication system provides services for voice and multimedia such as video. The service for voice communication includes transmitting and receiving voice information between users of mobile communication. Moreover, the service for multimedia communication includes transmitting and receiving, not only voice, but also still images and video.

According to recent trend, mobile stations are provided with diverse multimedia features such as taking still pictures and recording moving pictures. Generally, a transmission data rate of 8 kbps-13 kbps is needed to support voice communication, and a transmission data rate of 32 kbps-64 kbps is need to support multimedia communication.

When communicating using the mobile station (MS), it is necessary to transmit and receive service option information for identifying different types of services. For example, the service option information includes information on whether the provided service is for voice communication or multimedia communication. That is, the service option information includes information related to a type of voice codec for the voice communication service and a type of data used for multimedia service. Once the type of service is identified, each type of service is assigned a service option number, and using the service option number, each communication scheme can be identified. For example, when a multimedia service in form of video is transmitted, independently processed voice and video are first multiplexed. Here, a specific service option number can be assigned to the video transmission format for the multiplexed voice and video.

The multimedia service for video communication provides users with live images of other users to whom they in communicating. To realize such a communication service, a system that supports high data rate is needed. When video communication for display live images is implemented, the need for higher data rate and more broadband space become apparent and consequently takes up the system's capacity. As such, a base station (BS) is forced to support less number of mobile stations. From the user's perspective, the communication service charges associated with the multimedia service increases due to high cost of maintaining the service, and therefore, the users are likely to not use the video communication feature of the multimedia service as much as the less costly voice communication services.

To combat the high cost of using the video service, based on the user's selection, other cost saving services can be used. However, there is no service options related to providing alternative cost saving services, such as providing expressions or feelings of the user as opposed to providing live images which equates to high service charges. Even if such service options are provided, a MS with this service option cannot communicate with a MS without this service option. Further, transmission delay can be expected during the negotiation process in providing such a service option.

SUMMARY OF THE INVENTION

Accordingly, the present invention is directed to a method of setup and controlling service connection that substantially obviates one or more problems due to limitations and disadvantages of the related art.

An object of the present invention is to provide a method of establishing connection between a first mobile station (MS) and a second MS in a mobile communication system.

Another object of the present invention is to provide a method of communicating with at least one mobile station (MS) for establishing service connection in a mobile communication system Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of establishing connection between a first mobile station (MS) and a second MS in a mobile communication system includes transmitting to at least one base station (BS) a service message which includes information of at least one service type supported by the first MS and the second MS, wherein the at least one service type relates to a multimedia service supported by each of the first MS and the second MS, transmitting a request message which includes information of at least one service type selected by the first MS, receiving a response message which includes information of the selected service type which is supported by both the first MS and a second MS, and transmitting a connection complete message between the first MS and the second MS for communication using the selected service type.

In another aspect of the present invention, a method of establishing connection between a first mobile station (MS) and a second MS in a mobile communication system includes transmitting a request message which includes information of at least one service type selected by the first MS out of all service types supported by the first MS, wherein the service types relate to multimedia services, receiving a response message which includes information of the selected service type which is supported by both the first MS and a second MS, and transmitting a connection request message between the first MS and the second MS for communication using the selected service type.

In further aspect of the present invention, a of communicating with at least one mobile station (MS) for establishing service connection in a mobile communication system includes receiving from at least one MS a service message which includes information of at least one service type supported by a first MS and a second MS, wherein the at least one service type relates to a multimedia service supported by each of the first MS and the second MS, receiving a request message which includes information of at least one service type selected by the first MS, transmitting a paging request message to the second MS, wherein the paging request message includes the at least one service type selected by the first MS, receiving a paging response message, transmitting a response message which includes information of the selected service type which is supported by both the first MS and a second MS, and receiving a connection complete message between the first MS and the second MS for communication using the selected service type.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
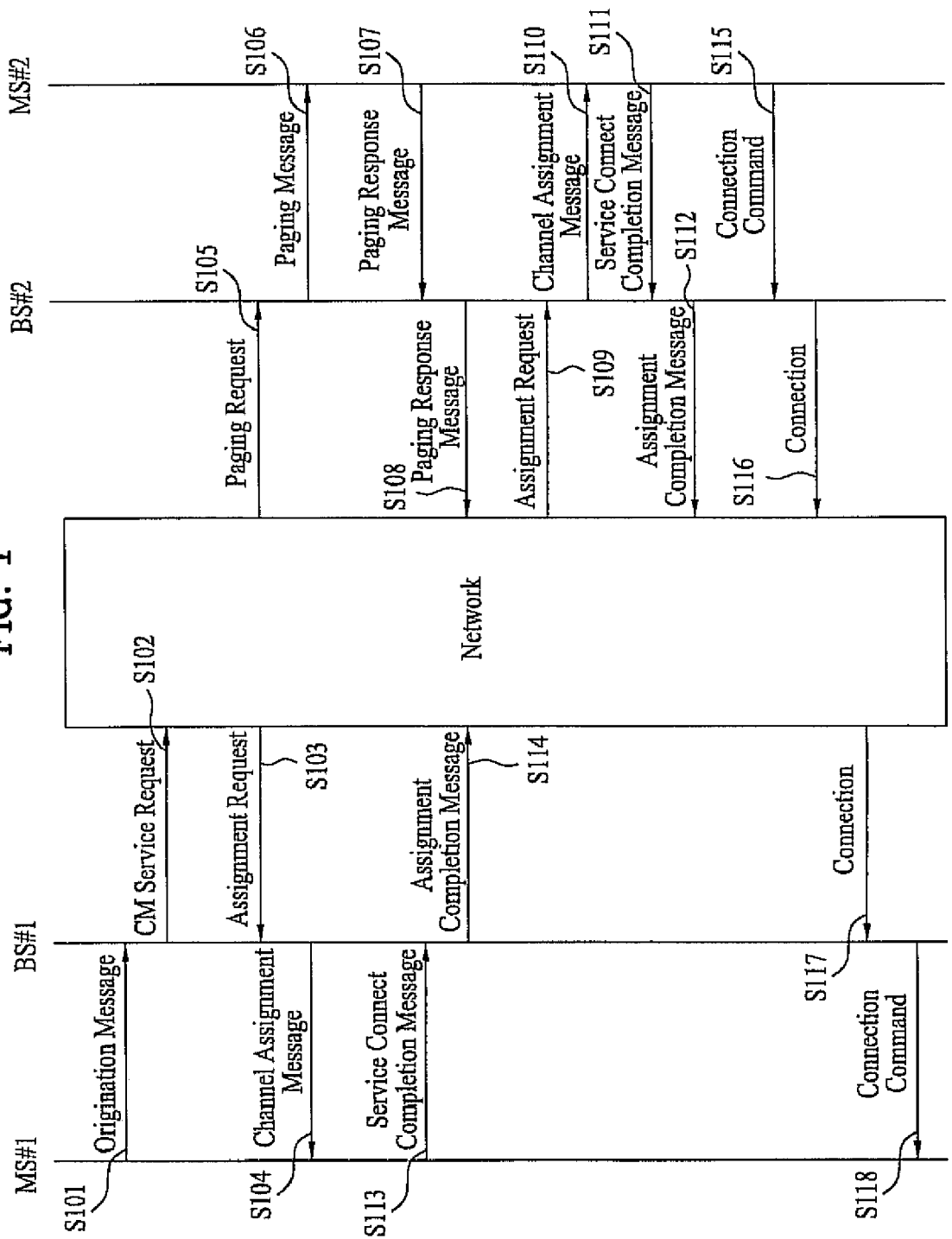
FIG. 1 is a diagram illustrating a call setup procedure.

FIG. 1 is a diagram illustrating a call setup procedure. For providing audio and video multimedia services, a call setup procedure takes place between an origination side and a destination side. Here, the origination side refers to a MS making the request for a specific service, and the destination side refers to a MS receiving the request and respond whether or not the requested service can be supported.

If MS#1 requests for a call setup with MS#2, MS#1 transmits an origination message to BS #1 to a cell to which MS#1 belongs (S101). The origination message includes an identifier (e.g., phone number) of MS#2 and the service option information representing a service type requested by a user.

The origination message further includes an indication which indicates whether or not the service option information is to be included. Here, the indication can be represented by a single bit, and the service option information can be represented by 16 bits. Since the indication is represented by a single bit (i.e., '0' or '1'), if the indication is '0', the service option information is not included in the origination message. In such a case, a basic variable rate voice service of 8 kbps is set as default. If the indication is '1', then the option information is included in the origination message.

Furthermore, the service option information can be represented by 16 bits, and each service option number can be assigned to a corresponding communication service. For example, in case of voice communication, according to the type of codec being used, service option #1 can represent a basic variable rate voice service having a transmission rate of 8 kbps, service option #3 can represent an enhanced variable rate voice service having a transmission rate of 8 kbps, and service option #17 can represent a high rate voice service having a transmission rate of 13 kbps. If the service relates to video communication, for example, service option #57 can represent a circuit-based video conferencing having a transmission rate of 32 kbps, service option #58 can represent a circuit-based video conferencing having a transmission rate of 64 kbps.

MS#1 can send the origination message including a request for a specific service option. In other words, a user of MS#1 selects a service option (e.g., avatar) from a plurality of service options supported by MS#1 (e.g., animation, avatar, emoticon) and requests for communication with a second MS using the selected service option. However, MS#2 (also referred to as a target MS) may not support the requested service option, or communication using the requested service option may be difficult or impossible at the time of request. To address such a potential problem, the origination message can include information on more than two (2) service options. Therefore, during the negotiation process between MS#1 and the network, any one of the two (2) or more service options can be determined upon.

After the origination message is received by BS#1, BS#1 transmits a complete L3 Info message to a network to request for a connection manager (CM) service (S102). The network then uses the complete L3 Info message and transmits an assignment request to BS#1 (S103). Upon receipt, BS#1 transmits a channel assignment message to MS#1 (S104). Here, the assigned channel can be a traffic channel.

Within a same cell, if BS#2 to which MS#2 belongs receives a paging request from the network (S105), BS#2 then transmits a paging message to MS#2 (S106). In the paging message includes the service option information requested by MS#1. After receiving the paging message, MS#2 can transmit a paging response message including a grant to the requested service option or a different requested service option information to BS#2 (S107). Here, MS#2 can take into consideration the possibility that the requested service option may not be granted by MS#1, and therefore, MS#2 can send to BS#2 the paging response message including more than two (2) or more service options which are supported by MS#2. Assuming that MS#2 is unable to support the service option requested by MS#1, two (2) or more service options provided by MS#2 can be used in negotiation between MS#1 and the network. Here, the negotiation takes place via a traffic channel.

After receiving the paging response message, BS#2 transmits to the network a complete L3 Info message to respond to the paging response message (S108). The network then uses the complete L3 Info message and transmits assignment request to BS#2 (S109). Upon receipt, BS#2 sends a channel assignment message to MS#2 (S110).

According to the channel assignment message received from BS#1 and BS#2, MS#1 and MS#2 each receive a traffic channel, respectively. The channel assignment message includes various information such as data rate and coding rate associated with uplink and downlink traffic channels for communication between the MSs and the BSs. Further, the BS can use the channel assignment message to notify whether to continue using the current service configuration or proceed with further service negotiation. Further service negotiation between MS#1 and the network are possible since the network has the information on the service options or types that can be supported by both MS#1 and MS#2. As such, during the negotiation, the service option that is supported by both MS#1 and MS#2 can be selected. As discussed, the negotiation takes place via the traffic channel.

By configuring the traffic channels based on the information provided in the channel assignment message, the MS and the BS can perform decoding operation on uplink/downlink signals. When the traffic channel for uplink/downlink communication is assigned, if MS#2 receives the requested service option by MS#1, a service connect completion message is transmitted to BS#1 and BS#2 by MS#1 and MS#2, respectively (S111, S113). BS#1 and BS #2 then send an assignment completion message to the network (S112, S114). Thereafter, a call setup is completed without further service negotiations (S115~S118).

Figure 2:
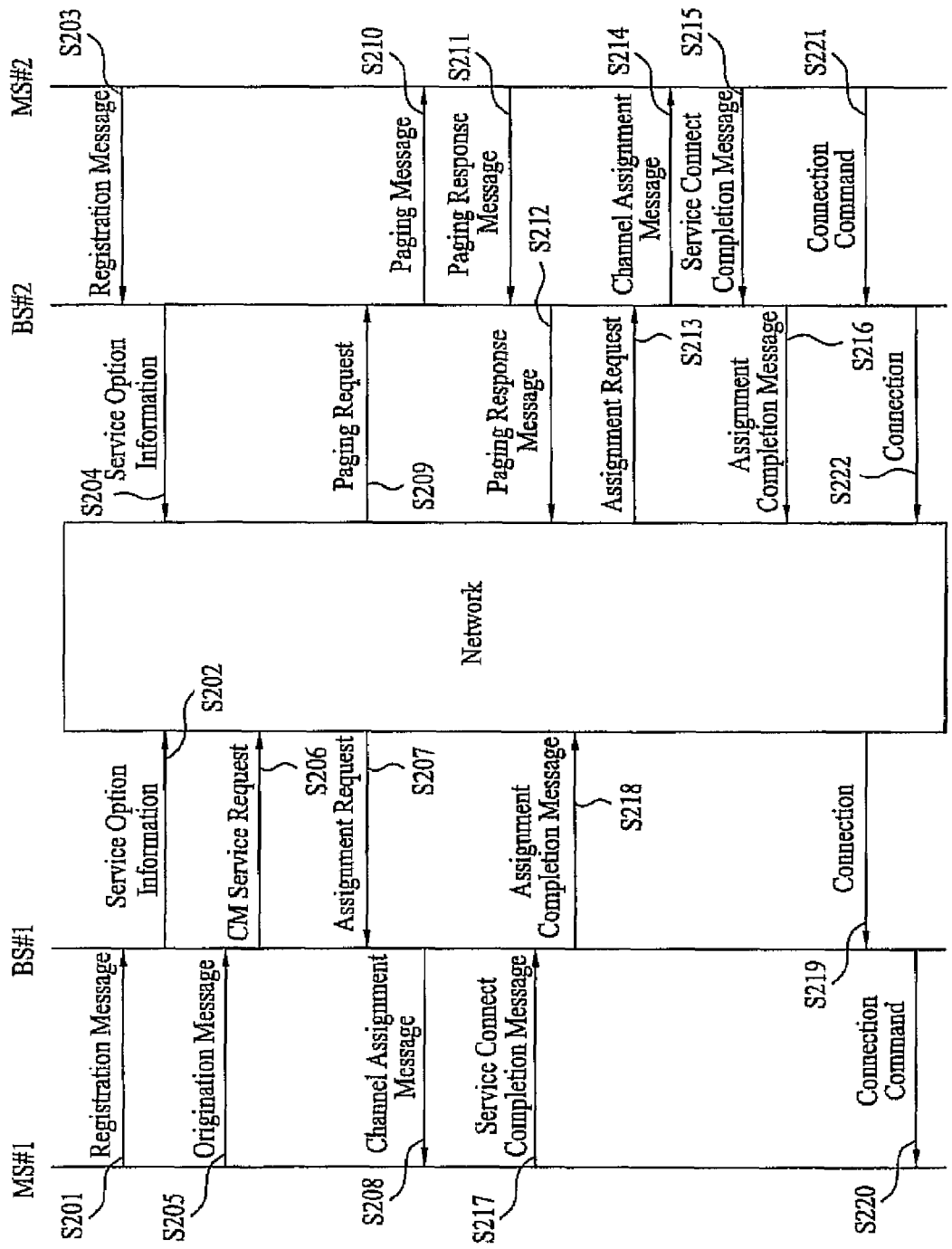
FIG. 2 is a diagram illustrating another call setup procedure.

FIG. 2 is a diagram illustrating another call setup procedure. As illustrated in FIG. 2, MS#1 transmits, periodically or as necessary, a registration message to BS#1 of its cell (S201). Here, the registration message includes service option information supported by MS#1. Table 1 shows examples of service options.

TABLE 1

| Service Option Number | Type of Service |
|---|---|
| 70 | Voice + Streaming Video |
| 71 | Voice + Short-time Video Script |
| 72 | Voice + Still Image |
| 73 | Voice + Animation |
| 74 | Voice + Virtual Image (Avatar) |

In Table 1, service option #70 represents a multiplexed voice and streaming video for transmission and service option #71 represents a multiplexed voice and short-time video script (e.g., MPEG) for transmission. Moreover, service option #72 represents a multiplexed voice and still images for transmission. Here, for example, still images related to various emotions or movement can be transmitted according to the user's selection. Furthermore, service option #73 represents a multiplexed voice and animation for transmission. Here, animation related to various emotions, movement, or expression of the user can be transmitted. The animation be transmitted to another's MS or can be displayed from pre-stored animated emotions, movements, or expressions in another's MS. Lastly, service option #74 represents a multiplexed voice and virtual image (e.g., Avatar) for transmission. Here, the virtual image, such as avatar, can be a figure of a person including a body, face, outfit, gender, hair color, skin color, and hairstyle, which can be selected by the user. For example, the user can represent a mate friend using the virtual image by selecting a male person with a slim face and blonde hair wearing a surfer's outfit.

The service option can be defined by any combination of streaming video, short-time video script, still image, animation, and virtual image such as avatar, and such a service option can be configured in advance between the MS and the BS. Alternatively, such a service option can be transmitted directly or can be transmitted based on expression or movement. If transmission is made based only the expression or the movement, a more efficient communication can be realized.

For example, if the still images, animation, and avatar corresponding to MS#1 are pre-stored in MS#2, the user of MS#1 can use a short-cut key or a jog dial, among other input means, to transmit information only on the movement or expression of the avatar. Here, since the information on the entire avatar need not be transmitted, more efficient communication can be realized.

After BS#1 receives the registration message, BS#1 transmits the information on the service option to the network (S202) which in turn is stored by the network. Table 2 is an example of a part of the registration message.

TABLE 2

| Field | Length (bits) |
|---|---|
| [...] | |
| NUM_SO | 4 |
| {NUM_SO} | |
| SERVICE_OPTION | 16 |
| {NUM_SO} | |

In the registration message as shown in Table 2, a number of the SERVICE_OPTION field between the {NUM_SO} and {NUM_SO} fields included in the registration message corresponds to a value of NUM_SO.

Further, MS#2 transmits, periodically or as necessary, a registration message to BS#2 of its cell (S203). After BS#2 receives the registration message, BS#2 transmits the information on the service option to the network (S204) which in turn is stored by the network.

If MS#1 requests for a call setup with MS#2, MS#1 sends an origination message to BS#1 of the cell to which MS#1 belongs (S205). The origination message includes an identifier (e.g., phone number) of MS#2 and the service option information representing requested service type. In other words, the requested service type is the service option type with which MS#1 desires or seeks to communicate to MS#2. For example, the requested service type is an emoticon.

After the origination message is received by BS#1, BS#1 transmits a complete L3 Info message to a network to request for CM service (S206). The network then uses the complete L3 Info message and transmits an assignment request to BS#1 (S207). Here, the assignment request information includes the service option information supported by both BS#1 and BS#2.

Each of MS#1 and MS#2 transmits the service option information (S201, S203), and the service option information is then transmitted to the network via respective BSs (S202, S204) which are then stored by the network. Consequently, the network has information on the service option supported by MS#1 and the service option supported by MS#2. Furthermore, the network can transmit an assignment request message, which includes the service option information supported by MS#1 and MS#2, to BS#1. Upon receipt, BS#1 sends a channel assignment message, which includes the service option information supported by MS#1 and MS#2, to MS#1 (S208).

Table 3 is an example of a channel assignment message.

TABLE 3

| Field | Length (bits) |
|---|---|
| [...] | |
| SERVICE_OPTION_INCL | 1 |
| SERVICE_OPTION | 0 or 16 |

As shown in Table 3, the SERVICE_OPTION field included in the channel assignment message includes information on the service option supported by both the transmitting MS and the receiving MS. If BS#2 receives a paging request, in which service option information supported by MS#1 and MS#2 in included, from the network (S209), BS#2 then transmits a paging message to MS#2 (S210). Upon receiving the paging message, MS#2 transmits a paging response message to BS#2 (S211). Here, the paging response message includes a selected service option from the service options supported by MS#1 and MS#2.

After receiving the paging response message, BS#2 transmits a complete L3 Info message to the network for responding to the paging response message (S212). The network then uses the complete L3 Info message and transmits assignment request to BS#2 (S213). Upon receipt, BS#2 sends a channel assignment message to MS#2 (S214).

According to the channel assignment message received from BS#1 and BS#2, MS#1 and MS#2 each receive a traffic channel, respectively. The channel assignment message includes various information such as data rate and coding rate associated with uplink and downlink traffic channels for communication between the MSs and the BSs. Further, the BS can use the channel assignment message to notify whether to continue using the current service configuration or proceed with further service negotiation.

By configuring the traffic channels based on the information provided in the channel assignment message, the MS and the BS can perform decoding operation on uplink/downlink signals. When the traffic channel for uplink/downlink communication is assigned, if MS#2 receives the requested service option by MS#1, a service connect completion message is transmitted to BS#1 and BS#2 by MS#1 and MS#2, respectively (S215, S217). Thereafter, a call is configured without further service negotiations (S218~S220, S216, S221~222).

Figure 3:
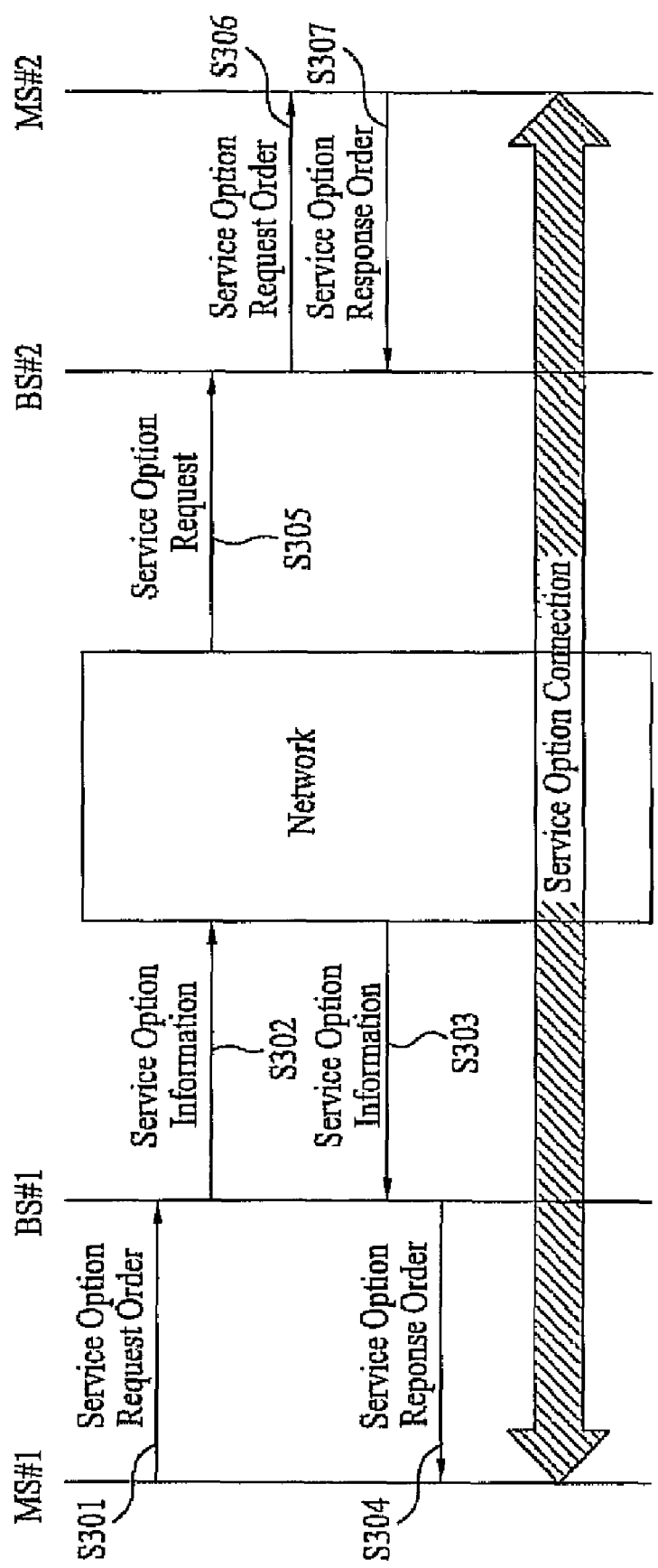
FIG. 3 is a diagram illustrating another call setup procedure.

FIG. 3 is a diagram illustrating another call setup procedure. In FIG. 3, a call is setup using the procedures as explained in FIG. 2, and additionally, a service option can be changed or added during communication which is taking place according to a selected or specific service option.

If a MS#1 user communicating according to a specific service option requests for a service option change, MS#1 transmits a service option request order to BS#1 (S301). Here, other service option information can be inputted using input means such as by a short-cut key or a jog dial. Here, the inputted service option information is transmitted to the receiving end in a form of a control signal. For example, if the specific service using a still image to express a user's movement, expression, or emotion is being used during communication, the MS#1 user can use a short-cut key or the jog dial to select a service option using an avatar. That is, the user can change from the service option using the still image to the service option using the avatar.

If the user changes the service option during communication, BS#1 transmits the requested or newly selected service option request information to the network (S302). The network uses the information of MS#2 registered via the registration message to determine whether MS#2 supports the service option requested by MS#1. Since the network has the information related to the service options supported by MS#2, the service negotiation procedures can be omitted, and the determination as to whether MS#2 supports the service option requested by MS#1 can be made directly.

If the network determines that MS#2 supports the MS#1 selected service option, the network transmits service option response to notify BS#1 that the service associated with the selected service option can be supported (S303).

On the contrary, if the network determines that MS#2 does not support the MS#1 selected service option, the network transmits service option response to provide BS#1 with the service options supported by both MS#1 and MS#2 (S303). In response, BS#1 transmits a service option response message, which includes the information from the network, to MS#1 (S304).

If the service option requested by MS#1 is supported by BS#2, the network transmits service option request, which includes the requested service option information, to BS#2 (S305). Thereafter, BS#2 transmits a service option request order to MS#2 (S306). Upon receipt, MS#2 sends a service option response order to BS#2 to confirm service capability (S307). Lastly, a new service is executed according to the new service option (S308).

As discussed, each MS provides various service options. By using these service options, such as an avatar, emoticon, and animation, the transmission/reception capacity can be used more efficiently and increased compared to the video communication service option. Moreover, the service option for transmitting special characters associated with the user can also be provided.

For example, during voice communication, an avatar representing the caller can be displayed on the called person's screen of the MS. The caller can use this avatar to express the feelings and/or emotions desired to be conveyed by movement and expressions (e.g., smile, laughter, anger, frustration, and boredom) from the caller's end. If the avatar is used instead of video, much smaller wireless resources are consumed via the transmission, and more efficient transmission can be attained while maintaining the realistic feel to the conversation between the users.

Figure 4:
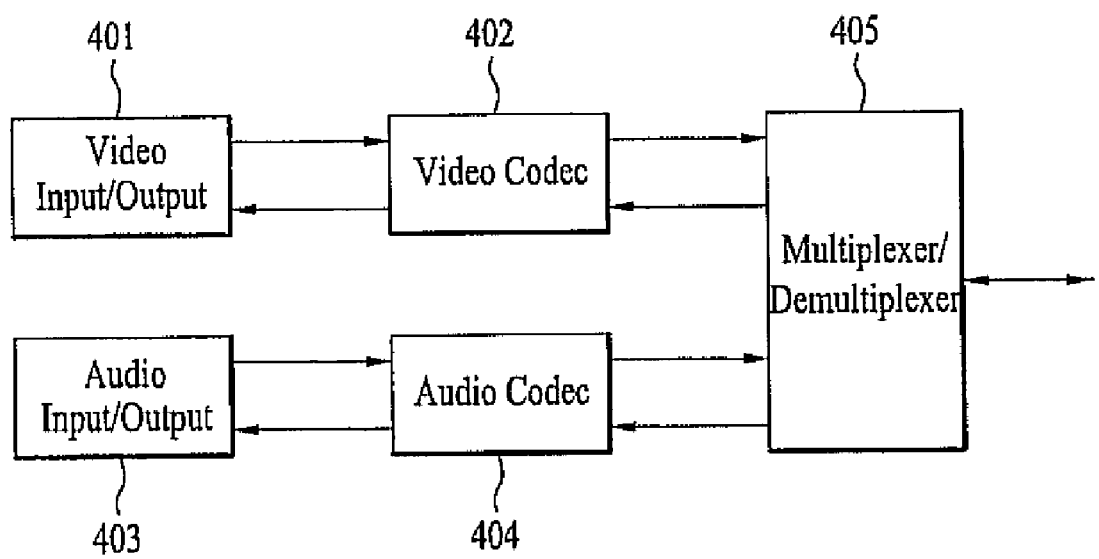
FIG. 4 illustrates a block diagram of a MS executing a service option feature.

FIG. 4 illustrates a block diagram of a MS executing a service option feature. In FIG. 4, animation, avatar, emoticon, or text is used to express feelings of the user during the conversation with another user. Referring FIG. 4, the MS receives information, such as an avatar for expressing how the user feels and animation for expressing different movements of the user, from the user via a video input/output unit 401. The MS then select the received avatar, emoticon, or animation for expression, can edit by using the pre-stored information, or can create anew an avatar, emoticon, or animation. For example, the user can select facial expressions such as frowning or smiling, movements such as dancing or holding up a fist, or emoticons such as a flower or a heart during a conversation using an avatar. Here, the selected animation, avatar, or emoticon is displayed on the screen of the MS and thereafter is inputted into a video codec unit 402 to transmit the selection to the MS of another user. Since the user is engaged in a conversation or voice communication with another user, the voice inputted to voice input/output unit 403 is converted to digital signal before being inputted to an audio codec unit 404.

The video codec unit 402 performs coding for information related to avatar, emoticon, and animation as well as control information associated with the information. The audio codec unit 404 performs coding for audio signals which is subsequently inputted into a multiplexer/demultiplexer 405. The multiplexer/demultiplexer 405 multiplexes the coded audio signal and the coded video signal and transmit the multiplexed signal to the BS.

Further, the multiplexed audio and video signals is received by the BS and upon reception, demultiplexed by the multiplexer/demultiplexer 405. The demultiplexed signals are then decoded by the audio codec unit 402 and the video codec unit 404. Lastly, the decoded video signal and the decoded audio signal are processed by the video input/output unit 401 and the audio input/output unit 403, respectively, before being transmitted to a user.

Figure 5:
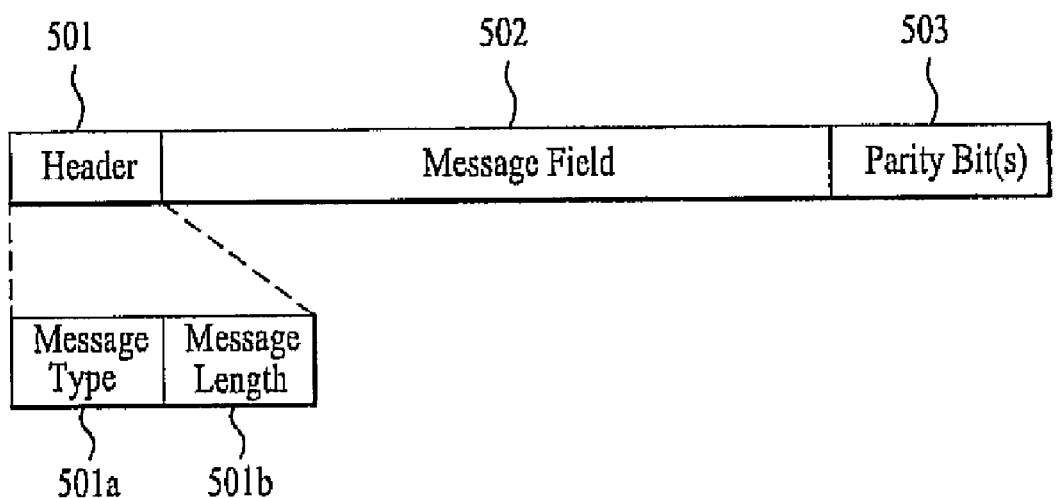
FIG. 5 illustrates an example of a message for audio codec.

FIG. 5 illustrates an example of a message for audio codec. Referring to FIG. 5, a header field 501 for video codec can be further classified by a message type part 501*a* and a message length part 501*b*. More specifically, the message type part 501*a* indicates whether service option, such as avatar, emoticon, or text, is included in the message, and the message length part 501*b* includes lengths for each service option such as avatar, emoticon, or text.

Furthermore, a message field 502 includes encoded data corresponding to the length of the header. Moreover, parity bits 503 can be added for error detection.

As discussed above, the service option information related to avatar, still images, emoticon, and animation, among others, can be provided to the network by MS#1 and MS#2. With that, the network retains the service options are known in advance, before any requests are made by a MS, by the network and can facilitate communication during the connected state. When the communication takes place between MS#1 to MS#2, the bandwidth or frequency bandwidth used for communication can vary depending on the selected service option. In other words, selecting to communicate based on one of the service options can occupy less bandwidth than communicating using a full video stream. That is, since the network has the information of the service types pre-stored, the traffic flow between MS#1 and MS#2 would be minimal compared to transmitting the full video stream.

For example, assume that MS#1 and MS#2 have selected to communicate using an emoticon. If MS#1 wants to convey to MS#2 that he or she is smiling, MS#1 can select a short-cut key to indicate that he or she is smiling. Here, the transmission of an emoticon requires very minimum bandwidth. On the contrary, if MS#1 wants to convey his or her smiling state using video stream, then the bandwidth occupied by sending this full video stream would be much greater than a simple emoticon. In short, by communicating based on an agreed service option, the bandwidth occupancy for transmitting the message decreases compared to transmitting the message using full video stream which demand much bandwidth and a like.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of establishing a connection between a first mobile station (MS) and a second MS in a mobile communication system, the method comprising:
   transmitting to at least one base station (BS) a service message which includes information of at least one service type supported by the first MS and the second MS, wherein the at least one service type relates to a multimedia service supported by each of the first MS and the second MS;
   transmitting a request message which includes information of at least one service type selected by the first MS;
   receiving a response message which includes information of the selected service type which is supported by both the first MS and the second MS;
   transmitting a connection complete message between the first MS and the second MS for communication using the selected service type; and
   transmitting a change service message to the second MS to request communication using a different service type during a connected state in which the first MS and the second MS are connected.

2. The method of claim 1, wherein the information of the at least one service type included in the service message transmitted from the first MS and the second MS are stored by a network.

3. The method of claim 1, wherein the information of the at least one service type included in the service message from the first MS is different from the information of the at least one service type included in the service message from the second MS.

4. The method of claim 1, wherein the multimedia service includes communication of audio and at least one of still image, animation, avatar, and emoticon.

5. The method of claim 4, wherein the at least one of still image, animation, avatar, and emoticon follow a control signal which is used to convey at least one of emotion, expression, and movement of a user.

6. The method of claim 5, wherein the control signal is inputted by any one of a short-cut key or a jog-dial provided on the first MS.

7. The method of claim 1, wherein the request message further includes a first identifier of the second MS and a second identifier indicating whether information of a desired service type is included.

8. The method of claim 7, wherein the identifier indicating whether information of a desired service type is included is represented by a single bit.

9. The method of claim 7, wherein the desired service type is represented by 16 bits.

10. The method of claim 7, wherein the information of a desired service type is included in the request message if the identifier indicating whether information of a desired service type is included is represented by a specified bit.

11. The method of claim 1, further comprising receiving an assignment message through which a traffic channel is assigned for communication with a network.

12. The method of claim 1, wherein the response message is received via a traffic channel.

13. The method of claim 12, wherein the traffic channel is assigned via the response message which includes a field indicating information on at least one service type supported by both the first MS and the second MS.

14. The method of claim 1, further comprising establishing connection with the second MS using the selected service type upon receipt of a command from the network to establish connection.

15. The method of claim 1, wherein the change service message includes information of at least one service type.

16. The method of claim 1, wherein a bandwidth allocated for transmitting the service message which includes the information of the at least one service type occupies less bandwidth than a bandwidth used for transmitting video signals including a full video stream.

17. The method of claim 16, wherein at least one service type is transmitted via the bandwidth allocated for transmitting the service message based on the selected service type.

18. The method of claim 17, wherein at least one of still image, animation, avatar, and emoticon provided by the multimedia service is used to convey at least one of emotion, expression, and movement by using at least one of still image, animation, avatar, and emoticon pre-stored in the first MS and the second MS.

19. A method of establishing connection between a first mobile station (MS) and a second MS in a mobile communication system, the method comprising:
   transmitting a request message which includes information of at least one service type selected by the first MS out of all service types supported by the first MS, wherein the service types relate to multimedia services;
   receiving a response message which includes information of the selected service type which is supported by both the first MS and second MS;

transmitting a connection request message between the first MS and the second MS for communication using the selected service type; and transmitting a change service message to the second MS to request communication using a different service type during a connected state in which the first MS and the second MS are connected.

20. The method of claim 19, further comprising transmitting to at least one base station (BS) a message including information of at least one service type supported by the first MS.

21. The method of claim 19, further comprising receiving an assignment message through which a traffic channel is assigned for communication with a network.

22. The method of claim 19, wherein the information of the at least one service type included in the service message transmitted from the first MS is stored by a network.

23. The method of claim 19, wherein multimedia services include communication of audio and at least one of still image, animation, avatar, and emoticon.

24. The method of claim 19, wherein the response message is received via a traffic channel.

25. The method of claim 19, further comprising establishing connection with the second MS using the selected service type upon receipt of a command from the network to establish connection.

26. The method of claim 19, wherein the change service message includes information of at least one service type.

27. A method of communicating with at least one mobile station (MS) for establishing a service connection in a mobile communication system, the method comprising:

receiving from at least one MS a service message which includes information of at least one service type supported by a first MS and a second MS, wherein the at least one service type relates to a multimedia service supported by each of the first MS and the second MS;

receiving a request message which includes information of at least one service type selected by the first MS;

transmitting a paging request message to the second MS, wherein the paging request message includes the at least one service type selected by the first MS;

receiving a paging response message;

transmitting a response message which includes information of the selected service type which is supported by both the first MS and the second MS;

receiving a connection complete message between the first MS and the second MS for communication using the selected service type; and receiving a chance service message from the first MS or the second MS to request communication using a different service type during a connected state.

28. The method of claim 27, wherein the paging response message includes at least one service type supported by the second MS if the second MS is unable to accommodate the service type requested by the first MS.

29. The method of claim 27, wherein the paging response message includes a grant to the service type requested by first MS.

30. The method of claim 27, wherein the information of the at least one service type included in the service message transmitted from the first MS and the second MS are stored by the network.

31. The method of claim 27, wherein the information of the at least one service type included in the service message from the first MS is different from the information of the at least one service type included in the service message from the second MS.

32. The method of claim 27, wherein multimedia services include communication of audio and at least one of still image, animation, avatar, and emoticon.

33. The method of claim 27, further comprising receiving an assignment message through which a traffic channel is assigned for communication with a network.

34. The method of claim 27, wherein the response message is transmitted via a traffic channel.

35. The method of claim 27, wherein the change service message includes information of at least one service type.

36. The method of claim 27, wherein a bandwidth allocated for transmitting the service message which includes the information of the at least one service type occupies less bandwidth than a bandwidth used for transmitting video signals including a full video stream.

37. The method of claim 36, wherein at least one service type is transmitted via the bandwidth allocated for transmitting the service message based on the selected service type.

* * * * *